United States Patent [19]

Reisenweber et al.

[11] 4,385,787
[45] May 31, 1983

[54] RADIAL BEARING FOR HIGH-SPEED TURBOMACHINERY

[75] Inventors: Karl-Ullrich Reisenweber, Unterschleissheim; Franz Grafenegger, Dachau, both of Fed. Rep. of Germany

[73] Assignee: MTU Motoren-und Turbinen-Union Munchen GmbH, Fed. Rep. of Germany

[21] Appl. No.: 180,585

[22] Filed: Aug. 25, 1980

[30] Foreign Application Priority Data

Aug. 24, 1979 [DE] Fed. Rep. of Germany ....... 2934271

[51] Int. Cl.³ ............................................. F16C 32/06
[52] U.S. Cl. ............................... 384/114; 308/DIG. 1
[58] Field of Search ................ 308/9, 26, 76, 77, 121, 308/160, DIG. 1, DIG. 14, DIG. 15

[56] References Cited

U.S. PATENT DOCUMENTS

| 3,318,642 | 5/1967 | Peterson | 308/26 |
| 3,485,540 | 12/1969 | Nogle | 308/9 |
| 4,119,375 | 10/1978 | Kirk et al. | 308/9 |
| 4,133,585 | 1/1979 | Licht | 308/DIG. 1 X |
| 4,178,046 | 12/1979 | Silver et al. | 308/160 X |
| 4,223,958 | 9/1980 | Gray | 308/9 |
| 4,295,689 | 10/1981 | Licht | 308/26 X |

FOREIGN PATENT DOCUMENTS

| 2747399 | 4/1979 | Fed. Rep. of Germany | 308/9 |
| 1097730 | 1/1968 | United Kingdom | 308/DIG. 15 |
| 685856 | 9/1979 | U.S.S.R. | 308/DIG. 14 |

Primary Examiner—Stuart S. Levy
Assistant Examiner—Daniel P. Stodola
Attorney, Agent, or Firm—Scully, Scott, Murphy & Presser

[57] ABSTRACT

A radial bearing for high-speed turbo-machinery, which is constructed as an aerodynamic or spontaneously-acting bearing, wherein a spirally-wound foil is inserted in an annular space formed between the inner bearing journal and the outer bearing sleeve.

3 Claims, 3 Drawing Figures

RADIAL BEARING FOR HIGH-SPEED TURBOMACHINERY

BACKGROUND OF THE INVENTION

1. Field of the Invention

The present invention relates to a radial bearing for high-speed turbo-machinery, which is constructed as an aerodynamic or spontaneously-acting bearing, wherein a spirally-wound foil is inserted in an annular space formed between the inner bearing journal and the outer bearing sleeve.

The requirement to build always more powerful engines having as low a weight as possible leads in the design thereof to always higher turbine inlet temperatures and to more rapidly running rotors. In addition to numerous other components such as, for instance, the combustion chamber or turbine wheels at these operating conditions particularly the bearings are subjected to high thermal and mechanical stresses. Thus for example, the maximum rotational speeds of gas-generator rotors of a vehicular gas turbine lie in the magnitude of 40,000 to 60,000 rpm. At a median bearing diameter D of approx. 45 to 55 mm for the utilized antifriction bearings, this will produce a DN value in the range of $1.8 \times 10^6$ to $3.3 \times 10^6$. Moreover, the bearing towards the turbine side is subjected to extremely high thermal stresses. Notwithstanding optimal bearing lubrication and acceptable provision for lubricating oil cooling, under unfavorable operating conditions the temperature of the outer bearing ring can rise as high as approx. 260° C. and even higher. Even bearings which are designed specially for these types of stresses reach the limit of their load capacity. Complicating the foregoing is the fact that the best presently known synthetic oils cannot withstand such high temperatures without sustaining damage. During operation there occurs a thermal decomposition and carbonization of the oil which can lead to a considerable deterioration in the lubricating properties and, as a result, to premature failure of the bearing. Further, the oil becomes extensively turbulent due to the high temperatures and rotational speeds. The resultant oil mist can give rise to serious environmental pollution problems.

A distinction is made between two main groups of air bearings, such as in essence:
(a) Pressure-supplied (aerostatic) bearings, and
(b) Spontaneously-acting (aerodynamic) bearings.

The spontaneously-acting group of bearings can, in turn, be subdivided into:
(a) Rigid bearings (in which the surface of the bearing journal and bore is rigid)
(b) Quasi-flexible bearings (i.e. segmented pivot bearings with elastically supported rigid pads), and
(c) Flexible or resilient bearings.

2. Discussion of the Prior Art

In general, aerostatic or pressure-supplied bearings are constructed as rigid bearings, with the attendant disadvantages that are also known from oil-lubricated rigid bearings. Because of the low clearances (20–40 μm), the most exacting requirements are set during the manufacture of these pressure-supplied bearings which, amongst others, require a time-consuming and expensive method of manufacture.

In order to generate the necessary compressed air it is additionally necessary to employ auxiliary aggregates whereby the manufacturing demands are similarly relatively high. Further, in pressure-supplied bearings of this type it is necessary that the supplied air to them must be fine-filtered in order to avoid blockage of the narrow nozzle apertures of approximately 0.4 mm in diameter.

Another disadvantage of this known type of bearings is seen in that, in general, the so-called "half frequency whirl" occurs so as to set the limit of operation. This leads to vibrational amplitudes which are larger than the clearance of the bearing. The lubricant film can hereby be penetrated, with the further result of possible solids body friction, which leads to the immediate further consequence of a so-called "seizing" of the bearings.

The disadvantages referred to hereinabove in connection with pressure-supplied bearings concerning expensive manufacture as a result of the low bearing clearances, on the one hand, as well as concerning the expected undesirable consequences of the virtually unavoidable occurrence of the so-called "half-frequency whirl" as an operating limit, on the other hand, are also applicable to rigid spontaneously-acting bearings.

In the case of the so-called "quasi-flexible" bearings, for instance, segmented pivot bearings, there must also be considered a very high, barely acceptable precision of manufacture, wherein the design of this type of bearing, due to the flexible support of the individual segments, additionally necessitates a complicated, expensive manufacture.

With reference to the so-called "flexible-bearings" as spontaneously-acting bearings, in this connection there is further pointed to the following two articles:

(a) Dr. L. Licht and M. Branger "Motion of a Small High-Speed Rotor in 3 Types of Foil Bearings", from the Journal of Lubrication Technology, printed in the "Transactions of the ASME", April 1975 and (b) Dr. L. Licht "Foil Bearings for Axial and Radial Support of High Speed Rotors—Design, Development and Determination of Operating Characteristics" from the "NASA Contractor Report No. 2940", January 1978.

According to FIG. 31, page 48 of the latter publication, in this type of bearing, also designated as a polygonal bearing, a foil should be placed in the space between the outer bearing housing and the inner bearing journal. The outer location of the spirally wound foil is hereby bent in the configuration of a heptagon. The sides of the polygon are supported along the vertices against the bore surface of the bearing sleeve and in this manner forming "flexible beams on two supports", which provide a resilient support for the bearing journal. Until the present, bearings of this type have only been satisfactorily tested up to bearing diameters of approximately 1 inch. At increasing bearing diameters with the same number of edges, the beam length becomes always larger and thus the bearing journal support always softer.

Hereby, the so-called "polygonal bearing" becomes quite similar in its characteristics to a so-called "spiral bearing", and in effect because of the lack of a "true" spring element in the spiral bearing and the resultingly necessarily low yieldability of the bearing sleeve, which necessitate extremely close manufacturing tolerances in both the instances of the polygonal and the spiral bearing.

For the remainder, such a spiral bearing is illustrated in FIG. 4, page 274 of the article referred to under (a), and is based on the previously mentioned construction. A spiral bearing of that type is, accordingly, not in a position, on the one hand, of satisfying the necessary criteria with regard to relatively high shaft speeds through the combination of required relatively high yieldability of the bearing sleeve, and on the other hand, in affording calculation of a desired bearing rigidity.

SUMMARY OF THE INVENTION

Accordingly, it is an object of the present invention to obviate the disadvantages encountered in the prior art and in improving the spontaneously-acting spiral or helical bearing of the above-mentioned construction in connection with the mentioned combination and with consideration to the relatively high operating rotational speeds.

The inventive bearing is further characterized by a high degree of operational reliability with consideration being given to high thermal and mechanical loads and to a relatively simple and inexpensive construction.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
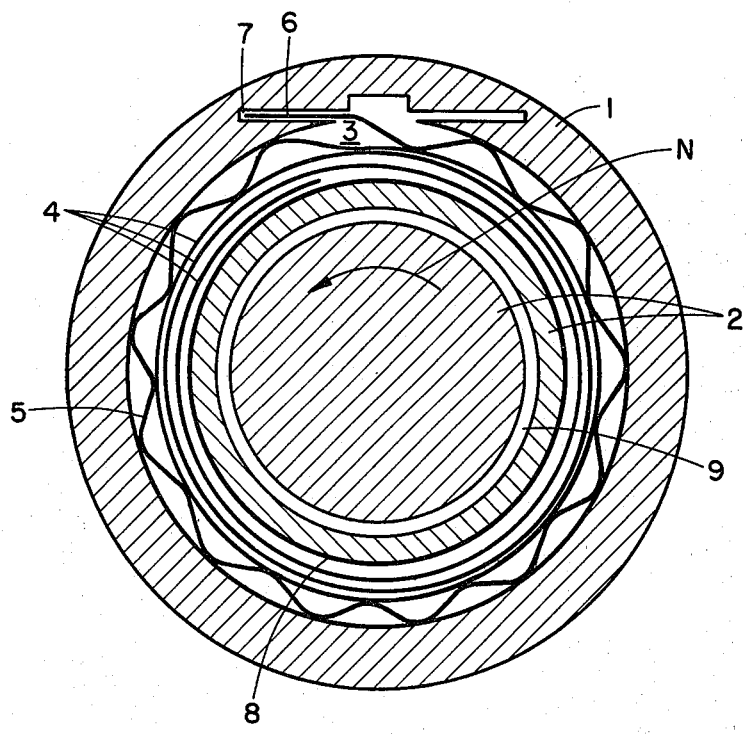
FIG. 1 illustrates a cross-section through the inventive bearing.

FIG. 1 illustrates a radial bearing which is constructed as an aerodynamic (self-acting) bearing. A foil is arranged in the annular space 3 which is formed between the outer bearing sleeve 1 and the inner bearing journal 2.

Commencing from the inner bearing journal 2, the foil is first wound, in this instance three times, in the form of a smooth strip 4 about the bearing journal, which provides the required bearing attenuation within the context of a laminated sheet packet damper; an outermost coil of the foil, directly adjoining the inner wall of the outer bearing sleeve 1, is designed as a spring element in the form of an undulating strip 5 which, essentially, determines the rigidity of the bearing. The innermost coil of the strip of foil, in effect the one which directly adjoins the inner bearing journal 2, herein is to be considered as the actual flexible bearing sleeve.

The foil, which consists of the smooth strip 4 and undulating strip 5, particularly with regard to the expected relatively high bearing temperatures of 400° C. and above, can preferably be produced from a high temperature-resistant material, for example, from a precipitation-hardenable steel with a high chromium content, a nickel-based alloy, or a so-called "superalloy" with a high chromium and molybdenum content.

In order that the spring elements, in effect, particularly the undulating strip of the foil 5, do not plastically deform a relatively high creep limit ($\delta'_{0.2} \geq 100$ kp/mm$^2$) is preferably laid down for the foil. Further, a foil thickness of 50–80 μm should be considered as being advantageous.

Whereas, in a first instance, with the bearing according to FIG. 1 the spring effect and rigidity of the bearing are determined by the undulating strip of the foil 5, the necessary attenuation of the bearing is, in a first instance, produced by the friction between the coil layers of the smooth foil strip 4 and by the "squeeze-film effect" of the intermediately located films of air.

Further, in accordance with FIG. 1, the outermost end of the foil 6 is fixed in a slot-like recess 7 formed in the outer bearing sleeve 1.

In the interest of an increased operational reliability, the inner journal can be provided with a hard surface coating 8 along its outer circumference. Employable as hard surface coatings in the sense of providing protection against wear there can be used, for example:

Chromium oxide—99% Cr$_2$O$_3$
LW IN-30—87% WC+13% Co
WT 1—83% WTiC+17% Ni
LW 16—84.6% WC+7.5% Co+4.2% Cr+3.5% C Suitably, the innermost part of the foil, in essence that part of the smooth strip 4 which immediately adjoins the bearing journal 2, can be provided with a special wear-protective coating such as, for instance, chromium oxide, silicon nitride, tantalum carbide or the like.

In the interest of providing a further improvement in the operational reliability with regard to high thermal loads (turbine-sided bearing in the gas generator of a small gas-turbine engine), at least one annular space 9 for cooling air can be machined into the inner bearing journal 2.

Figure 1A:
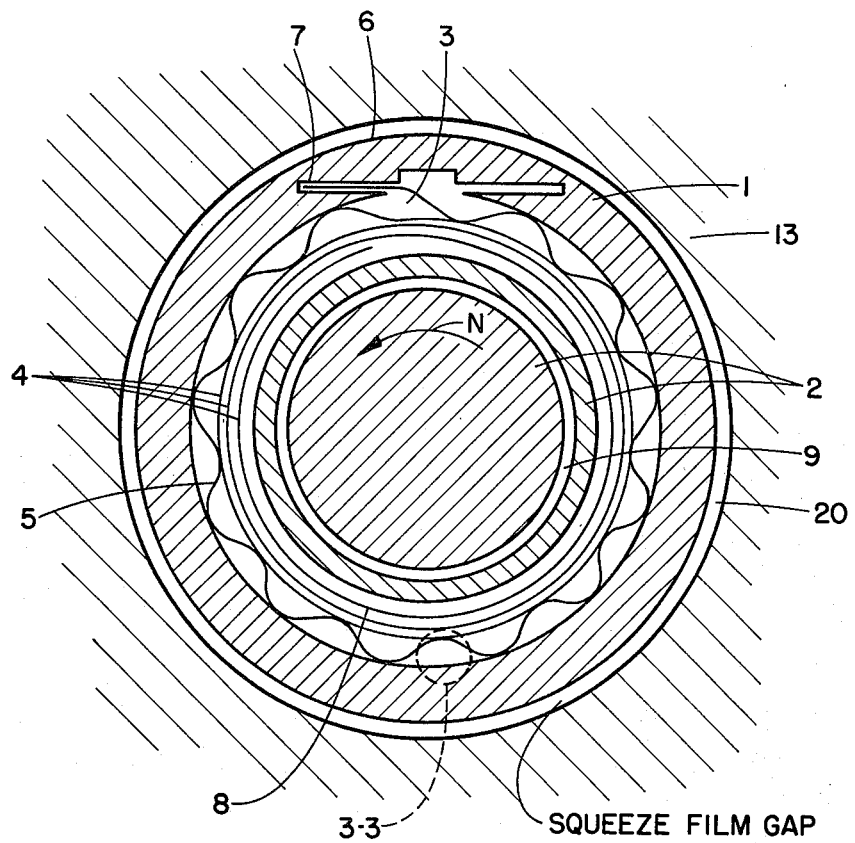
FIG. 1a illustrates a cross-sectional view of the preferred embodiment of the present invention.
Figure 3:
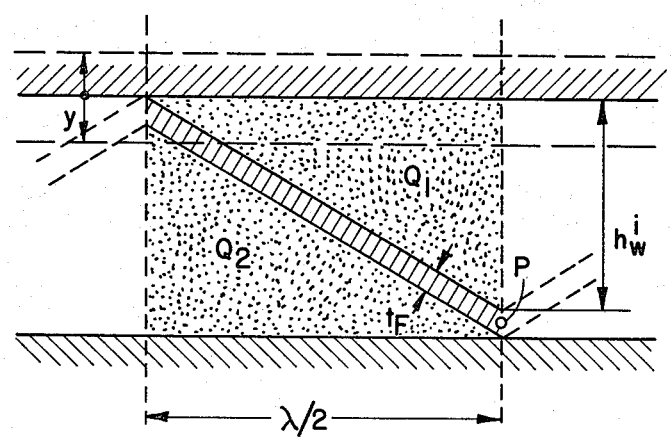

Further, within the context of an advantageous development, there can be provided additional damping through a film of lubricant within another annular space intermediate the outer surface of the bearing sleeve and the inner surface of a bore in the housing 13. This second annular housing 13 is clearly shown in FIG. 1a. In this annular space or gap, there is the known "squeeze film gap".

Figure 2:
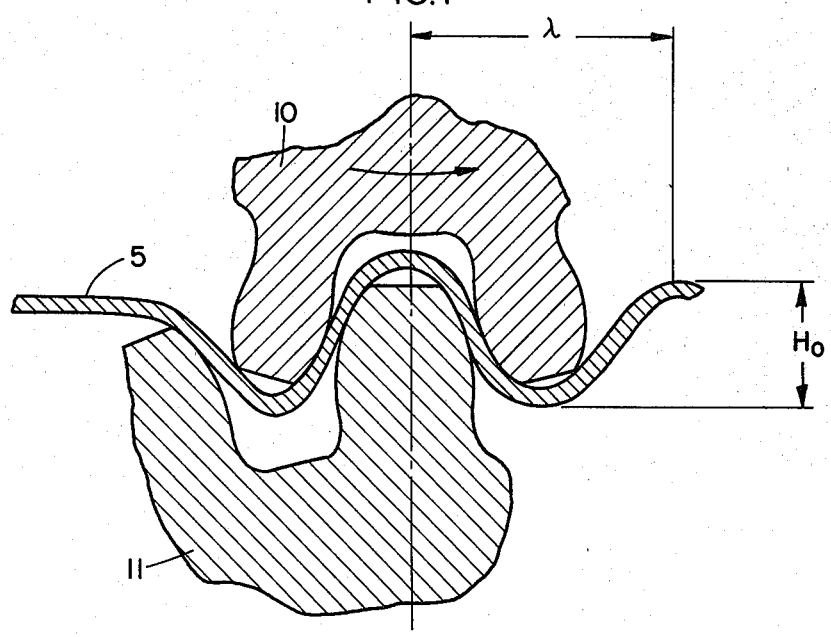
FIG. 2 illustrates an arrangement in which the strip of foil is imparted its undulating shape by being conveyed intermediate two toothed wheels.

Pursuant to FIG. 2 the wave-like or undulating section of the foil strip 5 can be obtained through an arrangement by means of which the foil is drawn through between an interengaging pair of gears or toothed wheels 10 and 11. The wave height H$_o$ and wave length λ can be varied depending upon the axial spacing between the gears and number of teeth.

The subject matter of the invention can be advantageously employed, for example, in small gas-turbine engines, small gas-turbine jet engines, turbo-chargers, or cabin ventilation systems in civil aircraft, or in expansion turbines which, for instance, are intended for the expansion of helium and sodium.

What is claimed is:

1. An aerodynamic radial bearing for high speed turbo-machinery, wherein within an annular space (3) between an outer bearing sleeve (1) and a bearing journal (2) there is positioned a single piece spirally shaped foil, a first portion (4) of which is formed as a smooth web encompassing said bearing journal (2) to provide bearing damping, and a second portion (5) of which is integrally attached to said first portion and extends outwardly along the bearing circumference and has an undulating shape which determines the rigidity of the bearing, and furthermore has one end (6) fastened to the inner wall side of said bearing sleeve, characterized by:
   a. said second foil portion (5) having a substantially uniform undulating shape, in a preformed web, extending around the entire bearing circumference;
   b. said uniform undulating shape of said second foil portion presenting a plurality of uniform, smoothly rounded exterior curves against the circumferential wall of said bearing race (1), and a plurality of uniform, smoothly rounded interior curves against said first smooth foil portion (4);

c. said first foil portion (4) being wound a plurality of times around said bearing journal (2);

d. one end (6) of said second foil portion (5) being positioned and held fixed within a tangential slot (7) of said bearing sleeve (1);

e. a hardened coating being provided on the entire section of said first foil portion (4) immediately adjoining said bearing journal, as well as on the corresponding entire circumferential section of said bearing journal (2); and f. a bore in the bearing housing (13) and the adjoining outer circumferential wall of said bearing sleeve (1) forming an annular space (20) to provide additional lubricating film damping.

2. Radial bearing as claimed in claim 1, comprising a slot-like recess being formed in the outer bearing sleeve, the outermost end of said foil being fastened in said recess.

3. Radial bearing as claimed in claim 1, said second foil portion being formed by drawing said foil between an interengaging pair of toothed wheels.

* * * * *